United States Patent
Ogland

[15] 3,643,177
[45] Feb. 15, 1972

[54] OPTICAL MASER
[72] Inventor: Jon W. Ogland, Glen Burnie, Md.
[73] Assignee: Westinghouse Electric Corporation, Pittsburgh, Pa.
[22] Filed: Nov. 17, 1969
[21] Appl. No.: 871,669

Related U.S. Application Data

[63] Continuation of Ser. No. 808,703, Mar. 19, 1969, abandoned, which was a continuation of Ser. No. 641,710, May 26, 1967, abandoned, which was a continuation of Ser. No. 265,461, Mar. 15, 1963, abandoned.

[52] U.S. Cl. ............................................. 331/94.5, 250/199
[51] Int. Cl. ............................................................ H01s 3/09
[58] Field of Search ............................... 331/94.5; 250/199

[56] References Cited

UNITED STATES PATENTS

| | | | |
|---|---|---|---|
| 2,697,077 | 12/1954 | Smith | 252/301.6 P |
| 2,922,049 | 1/1960 | Sunstein | 315/10 X |
| 3,202,934 | 8/1965 | Coffee | 331/94.5 |
| 3,314,021 | 4/1967 | Haun, Jr. et al. | 331/94.5 |
| 3,349,339 | 10/1967 | Thorington | 331/94.5 |
| 3,403,352 | 9/1968 | Ogland et al. | 175/1 |

FOREIGN PATENTS OR APPLICATIONS

| | | | |
|---|---|---|---|
| 1,335,136 | 7/1963 | France | 331/94.5 |

OTHER PUBLICATIONS

Bason: "Negative Absorption Coefficient at Indirect Transitions in Semiconductors," Advances in Quantum Electronics, Columbia Press, New York, March 1961, pp. 496-506.

Kaiser: "Fluorescence and Optical Maser Effects in $CaF_2$: Sm," Physical Review, Vol. 123, No. 3, pp. 766-76

Primary Examiner—Ronald L. Wibert
Assistant Examiner—R. J. Webster
Attorney—F. H. Henson, E. P. Klipfel and J. L. Wiegreffe

[57] ABSTRACT

Means are illustrated for electronically exciting phosphor material to provide a source of photon energy for pumping active negative temperature media. Preferably the phosphor has a fast decay time and is so chosen that its emission spectrum substantially matches or coincides with the absorption spectrum of the active negative temperature medium. The source of electrons may be a conventional cathode, or alternatively, one of special construction.

8 Claims, 9 Drawing Figures

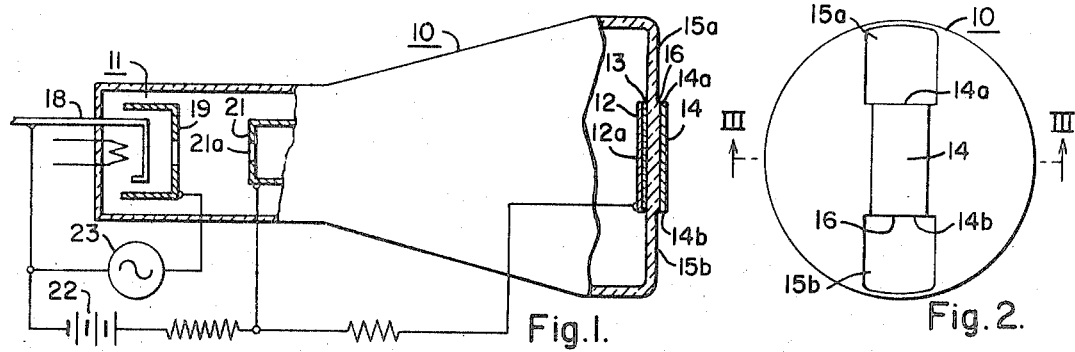
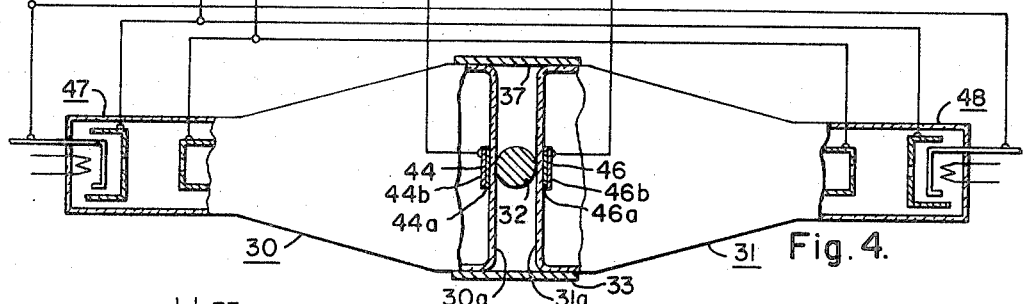
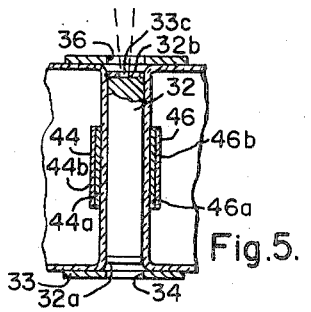
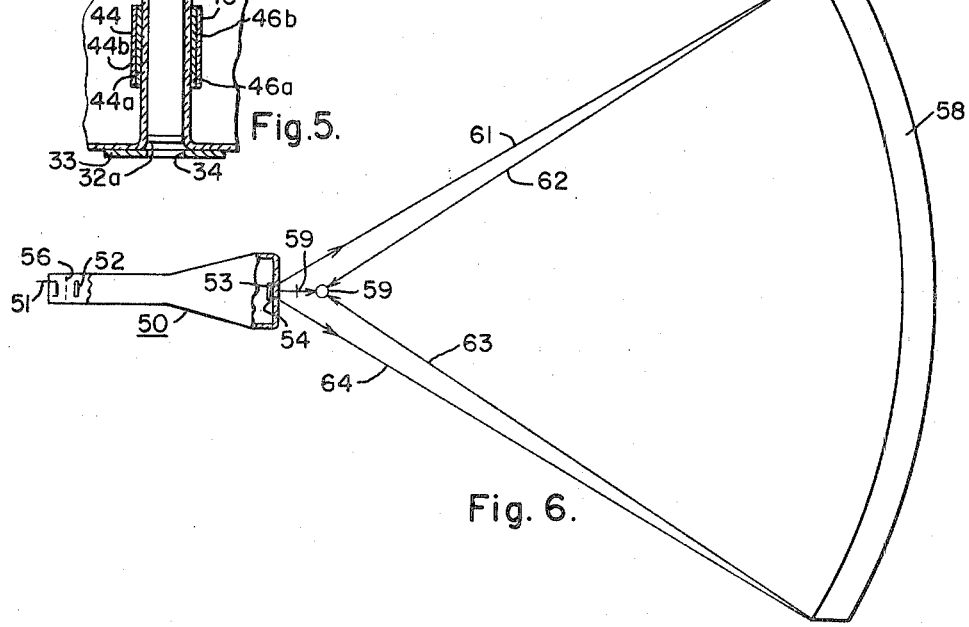

OPTICAL MASER

This application is a continuation of application Ser. No. 808,703, filed Mar. 19, 1969, now abandoned, which was a continuation of application Ser. No. 641,710, filed May 26, 1967, now abandoned, which was in turn a continuation of application Ser. No. 265,461, filed Mar. 15, 1963, also now abandoned.

This invention relates to improvements in optical masers, commonly referred to as lasers. More particularly, the invention relates to improvements in lasers pumped by an optical source capable of being modulated at high frequency.

It is well understood that a maser employs an active medium, either gaseous, liquid or solid, in which there can be established by "pumping action" at least intermittently, a nonequilibrium population distribution in at least a pair of the spaced energy states of its electrons. This "pumping" process is also called "state preparation." In this nonequilibrium state, the medium is said to have a negative temperature. Since the system is always tending to revert to the equilibrium state by a process competing with the pumping process, known as relaxation, the negative temperature condition represents stored potential energy.

Accordingly, it follows that some means is necessary to supply energy to a system to excite the electrons from their equilibrium states to the nonequilibrium states.

In such a system, the stored potential energy is evidenced by the negative temperature of the active material and when the energy is released it will be in the form of wave energy of a predetermined frequency or frequencies. The frequencies are determined by the negative temperature states which satisfy Planck's Law with respect to any two energy levels, which are in nonequilibrium, represented by the equation $\nu=(E_2-E_1)/h$ (1) where $E_2$ and $E_1$ represent, respectively, the upper and lower energy levels and $h$ is Planck's constant. If there be applied to the active medium, which is at a negative temperature, a frequency which satisfies equation (1) the applied signal will stimulate the emission of radiation at the signal frequency and the radiated energy will be in phase with, and amplify, the applied signal.

This may be a continuous process if energy is continuously supplied to the medium in the form of the pumping energy to cause continuously, in a cyclic fashion, electrons of the medium to be excited from one or more of the lower energy states to higher energy states from which the electrons fall back to lower energy states as they emit radiation to complete their energy transition cycle.

In lasers the pump frequency is usually higher than the lasing, or amplifying frequency. Also in converting from the usual commercial power sources to energy at the pump frequency there are usually two or three frequency conversion steps involved. The last step also usually involves a conversion from noncoherent to coherent radiation. Since the means involved in such conversion steps never achieves 100 percent efficiency there are necessarily energy losses involved. Also in some lasers, particularly those using a solid-state medium, the energy supplied to create the negative temperature of the medium is at frequencies representing energy state differences substantially greater than those corresponding to the frequency of the signal to be amplified. Because of this energy at any frequency absorbed by the active medium, but not at a frequency that can be used in the stimulated emission radiation amplification process, or any energy falling on the medium although not in the absorption band spectrum, results in heating of the medium and thereby causes a decrease in overall efficiency.

There is a greater probability for a portion of the atoms of active media to be excited to higher energy states by wave energy in certain bands of frequencies than for the other atoms. Since the atoms absorb energy as they go from their lower to their higher energy states, this band of frequencies constitutes the absorption band of the media. The atoms excited to the higher states do not return to their lower energy states by the same route by which they go to their higher states. Many of these more highly excited atoms spontaneously emit radiation as they go from their higher states to lower states and then when there is an interaction between wave energy and a frequency which corresponds to the difference between the energy states to which they have spontaneously emitted and their lower normal state, they emit coherent electromagnetic wave energy by stimulated emission of radiation. The energy at frequencies corresponding to the difference between the energy level from which stimulated emission occurred and the other energy states in the absorption band must be absorbed by the active medium in the form of heat. It is for this reason that it is desirable to pump a medium with energy at a frequency as close as possible to that at which the stimulated emission occurs in order to reduce the amount of energy which is dissipated to the lattice structure of the crystal and thereby to reduce the amount of the heating of the medium. Heating of the medium not only reduces the efficiency but it also adversely affects the lasering action. In accordance with the present invention the absorption band of the active maser medium is so related to the pump frequency spectrum that substantially all of the output frequency spectrum of the pump source falls within the absorption band of the active medium and it is at the same time near the frequency at which stimulated emission takes place thus increasing the overall efficiency.

Accordingly primary object of the present invention is to provide an improved optical maser embodying an improved means and method for converting electrical energy to optical energy for state preparation of the active medium at improved efficiency.

Another object is to provide an improved source of high frequency pumping energy for masers.

In a copending application of Irwin Wieder, Ser. No. 220,938 filed Aug. 27, 1962, which is a continuation of application Ser. No. 816,582, filed May 28, 1959, now abandoned, owned by the assignee of this application, a system is described and claimed in which energy at optical frequencies is derived from a source of electrical power, either direct current or at the commercial power source frequencies, for pumping active maser media to produce state preparation for laser action. In this copending application advantage is taken of the fact that in some media the absorption band is wider than the spectrum of the emission band and therefore a source of light having a rather wide band of frequencies is absorbed by the media and then emitted at the narrow substantially line spectrum. While the means shown therein is an advantage over prior art devices, the present invention provides an improvement over the system in the copending application in that it provides means for more efficiently converting electrical energy to optical energy substantially all of which is within the absorption band of the active media and very close to the emission band of the media and, therefore, results in a very greatly increased efficiency in state preparation of the media.

Another object of the invention is to provide a new and improved solid state light source for pumping maser media.

Another object is to provide a new and improved linear optical pump source for masers.

Another object is to provide a new and improved linear optical pump source which can be linearly modulated by an electrical control signal at high frequencies.

Still a further object is to provide new and improved solid-state linear optical maser capable of operating at increased efficiency.

The invention itself, both as to its organization and method of operation as well as additional objects and advantages will best be understood from the following description when read in connection with the accompanying drawings, in which:

FIG. 1 is a schematic illustration, partially in section, of one embodiment of the present invention;

FIG. 2 is a front end view of FIG. 1;

FIG. 3 is a sectional view of FIG. 2 on the line III—III and looking in the direction of the arrows;

FIG. 4 is a sectional profile view of a second embodiment of the present invention;

FIG. 5 is a partial horizontal sectional view of the center portion of FIG. 4;

FIG. 6 is a schematic illustration of a third embodiment of the present invention;

Figure 7:
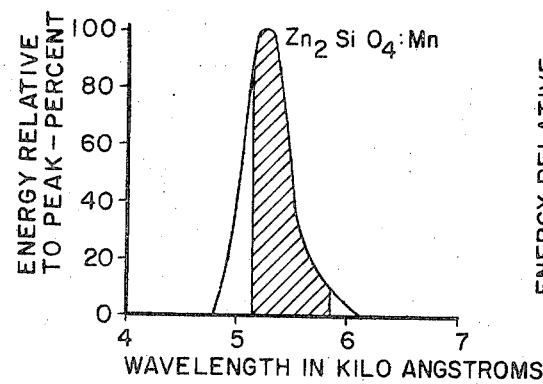
FIG. 7 is a graph showing the relation between a selected phosphor output spectrum and the absorption band of ruby maser medium.

Broadly speaking, the present invention comprises means for electronically exciting phosphor material to provide a source of optical energy for pumping active maser media. The invention provides means for directing a high-current, high-density, high-voltage electron beam of electrons onto a layer of phosphor material having a fast decay time, the phosphor being so chosen that its emission frequency substantially coincides with the absorption band of the maser media. In the illustrated embodiments a solid-state maser medium is shown, but the invention is also applicable to gaseous or liquid maser media. The electrical energy used in providing the electron beam is converted to optical energy at the pump frequency by suitably selecting a phosphor which is placed in juxtaposed relation to the maser medium. By selecting an active medium in which the absorption band is near the radiation emission band high quantum efficiency can be obtained and, therefore, a very high percentage of the optical energy thus generated is utilizable in causing state preparation of the electrons of the active maser medium to produce the necessary negative temperatures in the medium to thereby produce maser action. This enhances the overall efficiency of the system as compared to systems heretofore provided in that it reduces the amount of electrical energy which must be consumed in the conversion process from electrical to optical pumping energy.

Since the radiation spectrum of the phosphors is determined by the energy levels of activators in the phosphor crystal lattice structure the phosphor emission spectrum can be matched to the absorption band of the active medium by the proper choice of activators and the crystal lattice structure in order to obtain the best pumping efficiency and the least amount of heating of the maser media. The density of the radiation, that is, the amplitude of the emitted optical energy is determined by the density and the voltage of the exciting electron beam and, therefore, the source of emitted radiation can be readily modulated by suitably modulating the electron beam. As will be seen later, by properly selecting the phosphor material fast response and linear modulation can be obtained where the radiation emission output is proportional to the electrical power.

Three embodiments of a device briefly described above, which may be referred to as a cathodoluminescent pumped optical laser are illustrated in the drawings. It will be readily apparent to one skilled in the art and that other embodiments within the spirit of the invention could be provided.

Referring to the first embodiment, illustrated in FIGS. 1 to 3 inclusive, a suitable cathode ray tube 10 is provided with an electron gun 11, which provides a suitable source of electrons which are adapted to bombard a target 12 on which is deposited a suitable layer of phosphor 13. The phosphor may be deposited directly on the inside of the envelope of the cathode ray tube 10 or on a suitable substrate in a manner well known in the art.

An electrically conductive coating 12a, such as an aluminized film, is deposited on top of the phosphor layer 13. The aluminized film is pervious to electrons which bombard the phosphor and serves the function of preventing the formation of a charge on the phosphor. It also serves as a reflector for the optical energy from the phosphor.

Arranged on the outside of the envelope of the cathode ray tube, in juxtaposed relation to the phosphor 13, is a selected sample of active solid-state maser medium 14. This sample of medium 14 may be affixed to the outside of the envelope of the cathode ray tube 10 in any suitable manner, such as by cementing or any other holding means. Preferably the sample of medium 14 is rectangular in shape, as indicated in FIG. 3, and is attached to a land 16 which is formed on the face of the cathode ray tube 10 during the finishing of the ends 14a and 14b of the sample of active medium 14. During the finishing operation the end face of the tube may be ground away in the recessed areas 15a and 15b.

As illustrated in FIG. 2, the outer face of the cathode ray tube 10 is undercut by suitable grinding operations to leave the land 16 projecting slightly from the center of the cathode ray tube 10. The ends 14a and 14b of the maser medium 14 are finished off optically parallel to each other and, in accordance with known practice in the art, one of the ends, for example, the end 14a is coated with a substantially totally reflective layer while the other end 14b may be provided with a partially reflective coating. These coatings are usually made of silver or aluminum. From FIG. 1 it will be apparent that the inside face of the active sample of medium 14 is optically coupled through the land 16 to the outer face of the phosphor layer 13 whereby optical energy emitted from the phosphor 13 will excite the electrons of the active maser medium 14. The electron gun 11 includes a suitable cathode 18, a control electrode 19 and a suitable accelerating anode 21. In accordance with well-known practice the anode 21 has a beam-shaping aperture 21a of the desired shape of the electron beam. In this it is desired to produce an electron flood beam of approximately the size and shape of the target 12 merely for the purpose of conserving the power in the electron beam. The intensity of the electron beam, and accordingly, the intensity of the optical energy generated by the phosphor 13, is readily controlled by the voltage applied to the anode 21 and to the aluminized film on the phosphor, from a suitable direct current source 22 and by a control voltage supplied to the control electrode 19. A suitable source of modulating potential 23 is connected between the cathode 18 and the control electrode 19 to provide modulation of the electron beam from the cathode 18 to the target 12. The modulating potential source 23 may be a source of electrical pulses of the proper polarity and amplitude to cut on and off the flow of electrons from the cathode to the target, or alternatively, the source 23 may be any other voltage varying as a function of time, such as one desired in communication systems.

In the second embodiment of the invention, illustrated in FIGS. 4 and 5, two identical cathode ray cubes 30 and 31 are arranged face-to-face with the faces of both tubes being in contact with a sample of laser medium in the form of a round rod 32. The cathode ray tubes 30 and 31 may be substantially identical with that illustrated in FIGS. 1 to 3 inclusive, except that the faces 30a and 31a are substantially planar instead of having the special configuration of FIG. 1 with the central land to support the rectangular sample of active medium 14 of FIG. 1. An annular cylindrical sleeve 33 engages the cylindrical extremities of the cathode ray tubes 30 and 31 and is provided with holes 34 an 36 to receive the laser rod 32. The inside surface 37 is silver plated in order to direct light inwardly toward the laser rod. The ends of the rod 32 are optically parallel to each other and one and 32a may be provided with a substantially totally reflective surface while the other end 32b is covered with a partially reflective surface or with a surface the major portion of which is substantially totally reflective and has a centrally located aperture 33c through which coherent light may be directed in a beam from the laser rod 32 in a manner well known in the art. The targets 44 and 46, respectively, are provided with layers of phosphor 44a and 46a, respectively, on top of which are electrically conducting films 44b and 46b, respectfully, similar to the construction of FIG. 1. The phosphor layers 44a and 46a are excited by electrons in shaped electron flood beams provided by respective electron guns 47 and 48. As in the first embodiment of the electron flood beams are rectangular in shape and have a length which is substantially equal to the length of the rod 32 and a width which is substantially equal to the diameter of or slightly greater than that of the rod 32. Control of the electron beams is affected by control electrodes and suitable modulation voltages as in the first embodiment.

Although the laser medium is illustrated in the form of a rod 32 of circular cross section, the sample of laser medium to be optically coupled to the phosphor layers on the targets 44 and 46 could be rectangular in shape and of a thickness substantially less than the width, much like the sample of laser medium 14 shown in connection with the first embodiment.

In the third embodiment of the present invention, a cathode ray tube 50, illustrated in FIG. 6, is substantially identical with those illustrated in connection with the other embodiments, having an electron gun 51 for providing a shaped electron flood beam. The target 53, is provided with a layer of suitable phosphor material 54 and an aluminized film as in the other embodiments. The electron beam can be controlled by a control electrode 56 in a manner similar to that previously described. This embodiment utilizes means different from the previous embodiments for optically coupling the optical energy from the phosphor 54 on target 53 to a sample of laser medium 57.

To this end, the third embodiment is provided with a suitable concave mirror 58, the focal point of which is located between the center of the laser rod 57 and the excited phosphor as indicated at the point 59. The direct rays from the phosphor 54 on target 53 will illuminate all of the surface of the rod 57 facing the target 53 of the cathode ray tube 50 while, by correct positioning of the mirror 58, the backside of the rod 57 in the shadow of the direct light rays from the phosphor 54 will be illuminated by the light rays reflected from the mirror 58. This is illustrated by the two pairs of incident and reflected rays indicated by the arrows 61, 62, 63 and 64.

It has previously been mentioned that the radiation spectrum of phosphors is determined by the energy levels of the activators in the phosphor crystal lattice structure. The radiation density, on the other hand, is determined by the density and the voltage of the exciting electron beam. In accordance with this invention means are provided for independently controlling these two important factors in optical masers. This also provides means for readily matching the frequency of the pump source to the energy level system of the maser medium. Although the invention has been illustrated primarily as an optical maser, the electron excited phosphors could be used as a flexibly controllable pumping source for masers operating in the microwave range.

The phosphor emission spectrum may be matched to the laser absorption band by the proper choice of composition and activators to obtain the best pump efficiency and the least heating of the laser. In the embodiments illustrated a ruby crystal appropriately doped with chromium, constituting an active maser medium, having an absorption band extending from 5,150 to 5,850 A. may be used. The absorption bandwidth of approximately 700 A. substantially matches that of the radiation spectrum of the green-emitting $Zn_2SiO_4$:MN which has an emission spectrum as shown in FIG 7, shown by the crosshatched area. In this instance substantially 75 percent of the emission falls within the ruby absorption band.

Figure 8:
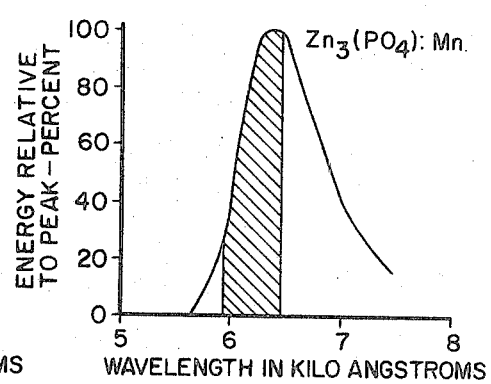
FIG. 8 is a graph illustrating the relation between the output spectrum of a selected phosphor and the absorption band of a specifically doped calcium fluoride maser medium.

As an alternative to the ruby laser medium a sample of calcium fluoride, appropriately doped with samarium, may be used as the active maser medium. This medium has an absorption band of approximately 500 A. extending from 5,950 to 6,450 A. With this medium a solid state light source phosphor could be $Zn_3(PO_4)_2$:Mn, which has the emission spectrum shown in FIG. 8 by the crosshatched area. It is to be understood that in all instances the phosphors selected would be chosen on the basis of their emission spectrum falling within the absorption spectrum of the sample of maser material used.

Figure 9:
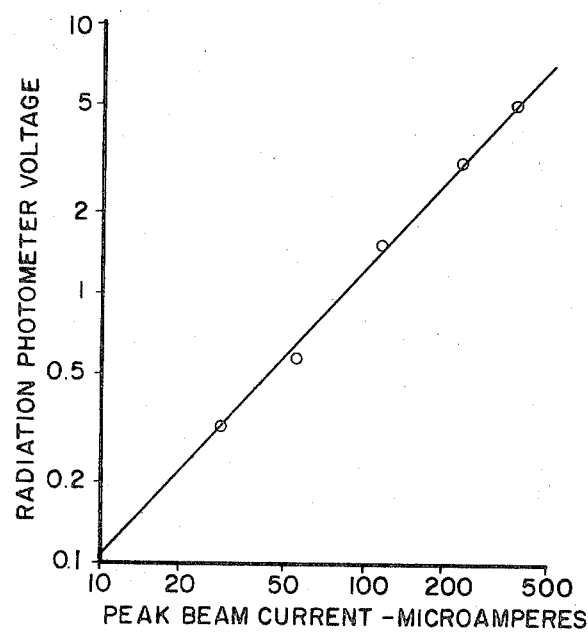
FIG. 9 is a graph illustrating the substantial relation between the electron beam current and the output of the excited phosphor.

In addition to the ability to match the spectral emission of the phosphor with the absorption band of the sample of active maser medium the electronically bombarded phosphors, in accordance with the present invention, have the advantage of very fast response and linear modulation, that is, the instantaneous output radiation is directly proportional to input electrical power in the electron beam. This is illustrated in FIG. 9, where the intensity of radiation is plotted as a function of the peak beam current in microamperes.

From the foregoing description it will be readily apparent that the present invention provides a means for providing efficient conversion from electrical power to coherent optical energy, the optical energy being subject to very flexible control merely by controlling the excitation of the phosphor by the electron flood beam. Also, it will be apparent that the present invention discloses means for flexibly matching the phosphor emission to the laser media.

It will be readily apparent to those skilled in the art that various changes and modifications could be made without departing from the spirit of the invention.

I claim as my invention:

1. Stimulated emission of radiation amplifier apparatus comprising an evacuated envelope presenting an environment for an electron beam, means for producing a beam of electrons in said envelope, phosphor pumping means in said envelope disposed for bombardment by said electrons for producing light output from said pumping means, a negative temperature medium mounted in juxtaposition to said pumping means and disposed for excitation by the light output from said pumping means.

2. The combination as set forth in claim 1, in which the major portion of the emission spectrum of said pumping means and the major portion of the absorption spectrum of said medium overlap.

3. The combination as set forth in claim 1, in which said means for producing a beam of electrons includes a cathode an an anode, said anode being in the form of a film, electrically conducting and pervious to said electrons, said film being juxtaposed to said phosphor-pumping means.

4. The combination as set forth in claim 1, in which said envelope has a planar end wall disposed substantially orthogonal to said electron beam, said pumping means is a layer of phosphor mounted on said planar end wall and disposed to be bombarded by said electrons and said anode is a thin metallic film pervious to said electrons.

5. The combination as set forth in claim 4, in which said layer of phosphor is on the inside of said sidewall and said metallic film is on the surface of said phosphor layer facing said electron beam, said film serving to reflect optical energy from said phosphor layer toward said negative temperature medium.

6. The combination as set forth in claim 4, in which said phosphor has an emission spectrum the major portion of which coincides with a major portion of the absorption spectrum of said medium.

7. The combination as set forth in claim 4, in which said pumping means is $Zn_2SiO_4$:Mn and said medium is ruby.

8. The combination as set forth in claim 4, in which said pumping means is $Zn_3(PO_4)_2$:Mn and said medium is $CaF_2$:$Sm^+B2$.

* * * * *